United States Patent
Sköld

(12)
(10) Patent No.: US 6,574,461 B1
(45) Date of Patent: Jun. 3, 2003

(54) BALANCED DIVERSITY

(75) Inventor: Johan Sköld, Åkersberga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/099,323

(22) Filed: Jun. 18, 1998

(30) Foreign Application Priority Data

Jun. 19, 1997 (SE) .............................................. 9702370

(51) Int. Cl.⁷ .............................. H04B 1/06; H04B 17/02
(52) U.S. Cl. ..................... 455/277.2; 455/132; 455/134
(58) Field of Search ................. 455/550, 132, 455/133, 134, 135, 136, 277.2, 101, 277.1; 375/299

(56) References Cited

U.S. PATENT DOCUMENTS

| | | | | |
|---|---|---|---|---|
| 3,670,275 A | * | 6/1972 | Kalliomaki et al. ......... | 455/132 |
| 4,218,654 A | * | 8/1980 | Ogawa et al. ............... | 370/324 |
| 4,259,742 A | * | 3/1981 | Burns et al. ................. | 348/607 |
| 4,499,606 A | * | 2/1985 | Rambo ..................... | 455/277.2 |
| 4,633,519 A | * | 12/1986 | Gotoh et al. ................ | 455/134 |
| 4,742,568 A | * | 5/1988 | Furuya .................... | 455/277.2 |
| 4,835,790 A | * | 5/1989 | Yoshida et al. ............. | 375/227 |
| 4,864,642 A | * | 9/1989 | Ueno et al. ............... | 455/277.2 |
| 4,977,615 A | * | 12/1990 | Suzuki et al. ............. | 455/277.2 |
| 5,065,411 A | * | 11/1991 | Muto ......................... | 375/232 |
| 5,203,024 A | * | 4/1993 | Yamao .................... | 370/334 |
| 5,337,061 A | * | 8/1994 | Pye et al. ..................... | 343/702 |
| 5,603,107 A | * | 2/1997 | Gottfried et al. ............ | 455/133 |
| 5,634,204 A | * | 5/1997 | Takahashi et al. .......... | 455/134 |
| 5,692,019 A | * | 11/1997 | Chang et al. ............... | 375/347 |
| 6,067,449 A | * | 5/2000 | Jager ....................... | 455/277.2 |

FOREIGN PATENT DOCUMENTS

| | | | |
|---|---|---|---|
| EP | 0 452 289 A1 | * | 10/1991 |
| EP | 0 454368 A2 | | 10/1991 |
| EP | 0 454585 A1 | | 10/1991 |
| EP | 0 593 822 A1 | | 4/1994 |
| EP | 0735 702 A1 | | 10/1996 |
| JP | 408195570 A | * | 7/1996 |
| WO | 93/06668 | | 1/1993 |
| WO | 95/11552 | | 4/1995 |
| WO | 95/33312 | | 12/1995 |
| WO | WO 98/58462 | | 12/1998 |

OTHER PUBLICATIONS

International Type Search Report, Apr. 29, 1998.

* cited by examiner

Primary Examiner—Charles N. Appiah

(57) ABSTRACT

The present invention relates to a method for diversity selection for antenna paths in a radio receiver (R2; R3) comprising a plurality of antennas (A, B; N) and a selection switch (SW; SWI) for selecting one of said antennas, which method comprises the following steps:

generation of average interference powers (AIA, AIB; AIN) of antenna signals received over a period of time to each of the antenna's (A, B; N);

generation of carrier signal strength (CSA, CSB; CSN) of radio signals (RSA, RSB) received to each of the antenna's (A, B; N);

selecting one of the antennas (A, B; N) in dependence of the best carrier signal strength (CSA, CSB; CSN) in relation to average interference signal strength (AIA, AIB, AIN).

8 Claims, 7 Drawing Sheets

BALANCED DIVERSITY

TECHNICAL FIELD

The present invention relates to methods and arrangements for diversity selection for antenna paths.

DESCRIPTION OF THE BACKGROUND ART

In most digital communications systems different kinds of diversity is used to reduce the effects of fading. Antenna diversity improves the receiver sensitivity and is one of the most common schemes, normally implemented as dual antenna diversity at the receiver.

There is a number of schemes for combining multiple antenna signals received with diversity. In post-detecting schemes, the combining can be done completely in the digital domain. Coherent combining schemes such as equal gain combining, maximal ratio combining and interference rejection combining are efficient post detecting schemes. The problem with post detecting schemes is that it requires multiple receivers. In a mobile station, the receiver complexity needs to be kept at a minimum. Pre-detection schemes are therefore desirable since only one complete receiver chain is required.

In the International Patent Application WO 95/11552, a diversity receiver having two receiver branches is shown. A control signal based on comparison between strength of the received signals is generated. Switching means are arranged to change-over a signal from either one of the receiver branches to a receiver output in dependence of the control signal. This previous known configuration causes however problem when implemented in a mobile station. Multiple antennas implemented in a mobile station are often a regular dipole antenna combined with an internal antenna. The internal antenna then gives an attenuated signal causing the weaker antenna to be selected less than 50% of the time. The implication is a reduced diversity gain compared to balanced antenna paths.

SUMMARY OF THE INVENTION

Problem with previous known techniques arises when antenna diversity is used in arrangements with both internal and external antennas. The internal antenna causes reduced diversity gain due to an attenuated signal caused by framing of the surrounded body.

This problem is solved in accordance with the invention by estimating average interference signal powers over a period of time for each of the received signals. When using these estimates to offset the selection criteria by the difference in interference powers, the antennas are selected in dependence of the best received carrier signal in relation to the average interference signal strength.

In one embodiment of the invention the interference strength of received radio signals is accumulated by adding the interference strength of a radio signal received by the selected antenna to previous accumulated values. The average interference signal strength is thereafter generated for the accumulated values of the signals received from each one of the antennas. A threshold offset signal corresponding to the difference in strength between the generated average interference signals is then generated. A selection signal corresponding to the threshold offset signal subtracted from the difference in strength between the carrier of received radio signals is thereafter generated. One of the antennas is then selected in dependence of the value of the selection signal. As a result, the signal having the best received carrier signal in relation to the average interference signal strength is received.

In another embodiment of the invention the interference strength of a plurality of received radio signals is accumulated by adding the interference strength of a radio signal received by the selected antenna to previous accumulated values. The average interference signal strength is thereafter generated for signals received from each one of the antennas. A signal corresponding to carrier in relation to average interference signal strength is thereafter generated and forwarded to a selector which points out the signal having the best carrier in relation to interference. The antenna delivering this signal is selected.

One object of the present invention is to obtain a diversity gain for unbalanced antenna paths equal to the diversity gain for balanced paths.

One of the advantages with the present invention is thereby that the diversity gain is the same for unbalanced antenna paths as for balanced antenna paths.

The invention will now be described more in detail with reference to exemplifying embodiments and also with reference to the accompanying drawings

BEST MODES OF CARRYING OUT THE INVENTION

When using radio receivers having multiple antenna paths it is essential to select the antenna that receives the signal with the most favourable signal quality, i.e. the signal having the best carrier signal in relation to interference.

In a mobile station, the receiver complexity needs to be kept at a minimum. Pre-detection schemes are therefore desirable, since multiple receivers are not required.

Figure 1:
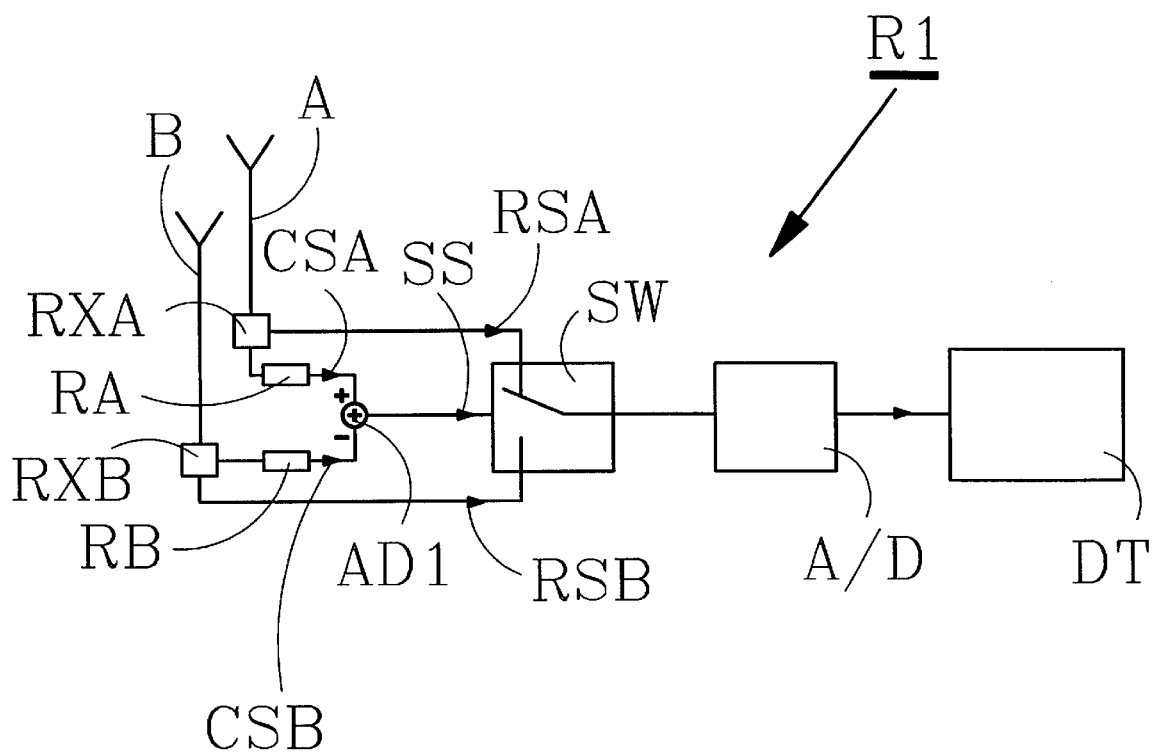
FIG. 1 is a block diagram illustrating a prior art radio receiver.

In FIG. 1, a selection diversity receiver R1 is shown. The receiver belongs to the state of the art and comprises two external antennas A and B for reception of radio signals. A selection switch SW is arranged to select one of the antennas A and B, i.e. to switch between the two antennas A and B. An analogue to digital converter A/D is applied via the switch SW and via amplifier/down-converters RXA, RXB to the selected antenna. A detector/equaliser DT is arranged to receive the converted digital signal and to eliminate interference. Measuring means RA and RB for RSSI measurements are adapted to each antenna, via the down-converters RXA and RXB, for additive logarithmic power measurements in decibels. An adder AD1 is adapted to the two antenna measuring means RA and RB. The adder AD1 comprises two inputs. The measuring means RA belonging to the first antenna is connected to the first input of the adder. The other measuring means RB is connected to the second input of the adder. The output from the adder AD1 is adapted to a selection input of the switch SW.

A method to select antennas in dependence of the most favourable signal is shown below. The method belongs to the state of the art and is based on RSSI measurements, thus selecting antenna signal A or B depending on which signal has the highest received signal strength. The method is used together with the configuration in FIG. 1 and comprises the following steps:

A first radio signal RSA and a second radio signal RSB is received by antenna A and B respectively.

Signal strength CSA, CSB from each of the received radio signals RSA and RSB are determined by RSSI-measurement in the antenna measuring means RA and RB respectively.

A selection signal SS is generated by subtracting in the adder AD1, the carrier signal strength CSB of the second radio signal RSB from the carrier signal strength CSA of the first radio signal RSA.

The switch SW is changed-over to the antenna that delivers the most favourable radio signal. If the selection signal is positive, i.e. if the first radio signal has the highest carrier signal strength, the first radio signal will be selected. If the selection signal is negative, the antenna delivering the second signal RSB will be switched over to.

Figure 2A:
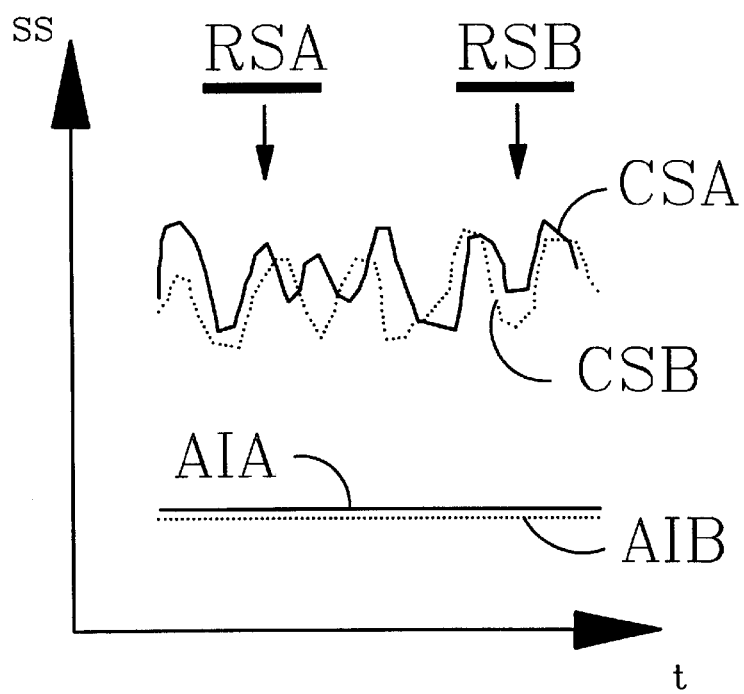
FIG. 2 shows diagram representing carrier and interference signal strength of received radio signals.

FIG. 2a is a diagram showing the strength of the signals received by the antennas A and B in the prior art embodiment. A received radio signal RSA or RSB comprises a carrier part CSA or CSB and an interference part. The carrier strength CSA of the first radio signal RSA received by the first antenna A is shown with a random line at a level representing the strength. The average strength of the interference part AIA from the first signal RSA is shown in FIG. 2a as a straight line at the interference strength level. The carrier strength CSB of the second radio signal RSB and the average interference strength AIB is also shown in FIG. 2a, as corresponding dot lines. It is assumed that the average carrier strength of the two radio signals RSA and RSB when received by the antennas are equal. This can be seen in FIG. 2a. Problem arises however if one of the antennas is an internal antenna which often is the case in mobile stations, e.g. in cellular phones. The internal antenna then causes a received radio signal to be attenuated. This attenuation is shown in FIG. 2b, which figure will be further discussed later in the text.

Figure 3:
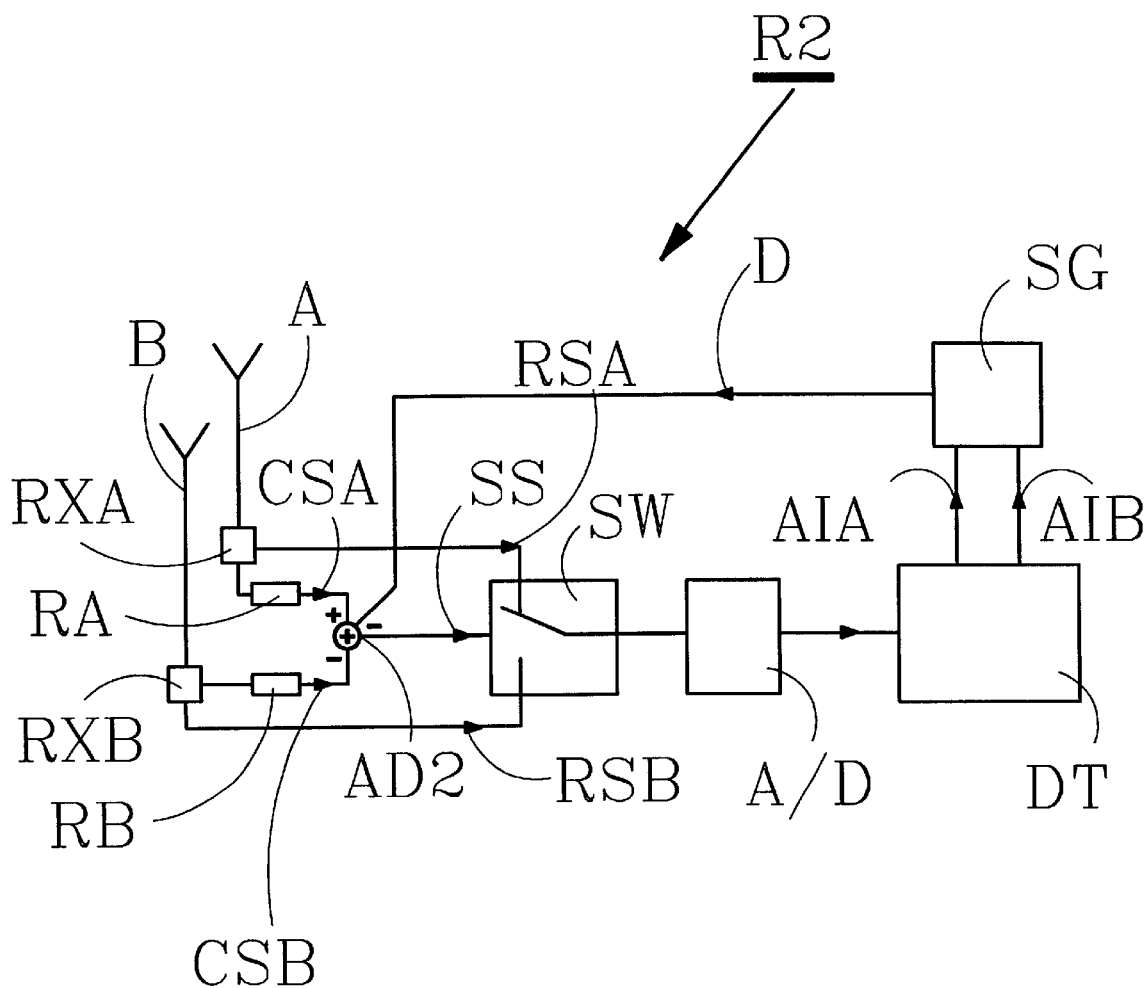
FIG. 3 is a block diagram illustrating a radio receiver according to the invention, having two antennas.

In FIG. 3, a selection diversity receiver R2 in accordance with the invention is shown. The receiver comprises two antennas A and B for reception of radio signals. The first antenna A is an external antenna while the second antenna B is an internal antenna located within the framing of the cellular phone. Measuring means RA and RB for RSSI measurements is adapted to each antenna via amplifier/down-converters RXA and RXB. A selection switch SW is arranged to select one of the two antennas A and B. An analogue to digital converter A/D is applied to the selected antenna via the switch SW and via the converters RXA, RXB. A detector/equaliser DT is arranged to receive a converted digital signal from the A/D-converter and a signal generator SG is applied to the detector DT. An adder AD2 is adapted to the two antenna measuring means RA and RB. The adder comprises three inputs. The measuring means RA belonging to the first antenna is connected to a first input of the adder. The other measuring means RB is connected to a second input. The third input of the adder AD2 is connected to the output of the signal generator SG.

Figure 2B:
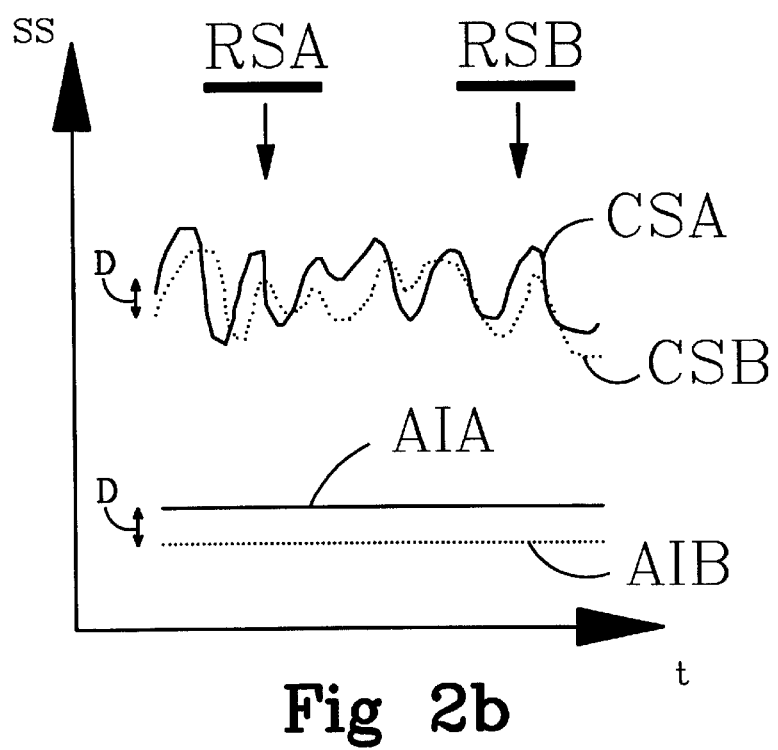

FIG. 2b represents a diagram showing the strength of the signals received by the configuration mentioned in FIG. 3. It is assumed that the strength of the signals RSA, RSB shown in FIG. 2b is equal to the strength of the signals shown in FIG. 2a. However, since the second antenna B is an internal antenna, the second signal RSB is attenuated as can be seen in FIG. 2b which will be further discussed below.

A method for diversity selection according to the invention will now be shown. The method is put into practise by the configuration already described together with FIG. 3. By using the method, a radio signal will be selected depending on the best carrier of the received signals RSA, RSB in relation to the average interference signal strength. When the method starts, the switch SW is in a position selecting the antenna A and the offset signal D is set to zero. The method comprises the following steps:

Radio signals RSA and RSB, a so called first radio signal RSA and second radio signal RSB, are received by the antennas A and B respectively.

The first radio signal RSA is forwarded from the first antenna A via the switch SW to the A/D-converter A/D.

The received first analogue radio signal RSA is converted into a digital signal.

The digital radio signal is sent to the detector DT.

The signal strength of the interference part of the received radio signal RSA from the selected antenna A measured in the detector DT. A method for this is well described in the international application PCT/SE93/00648. The measured signal strength is added to the already accumulated interference signals received from antenna A.

The average interference signal strength AIA, AIB for each of the accumulated signals is generated in the detector.

The average interference signal strengths AIA and AIB from both of the antennas are forwarded to the signal generator SG.

A threshold offset signal D is generated. The offset signal D corresponds to the difference in strength between the two generated average interference signals AIA and AIB. The threshold offset signal D is shown both in FIG. 3 and in FIG. 2b.

The threshold offset signal D is forwarded to the third input of the adder AD.

The carrier signal strength CSA of the signal received by the first antenna A is sent to the first input of the adder AD2 and the carrier strength CSB of the signal received by the second antenna B is sent to the second input of the adder.

A selection signal SS is generated in the adder AD2. The signal SS corresponds to the threshold offset signal D subtracted from the difference in strength CSA and CSB between received radio signals RSA and RSB.

The selection signal SS is forwarded to the switch SW.

One of the antennas A, B is selected. The selection depends on whether the selection signal SS is positive or negative. If the selection signal SS is negative the first antenna A will be selected and if the selection signal SS is positive the second antenna B will be selected. The selection of an antenna thereby depends on the best carrier of the received signals RSA and RSB in relation to the average interference signal strength.

Figure 4:
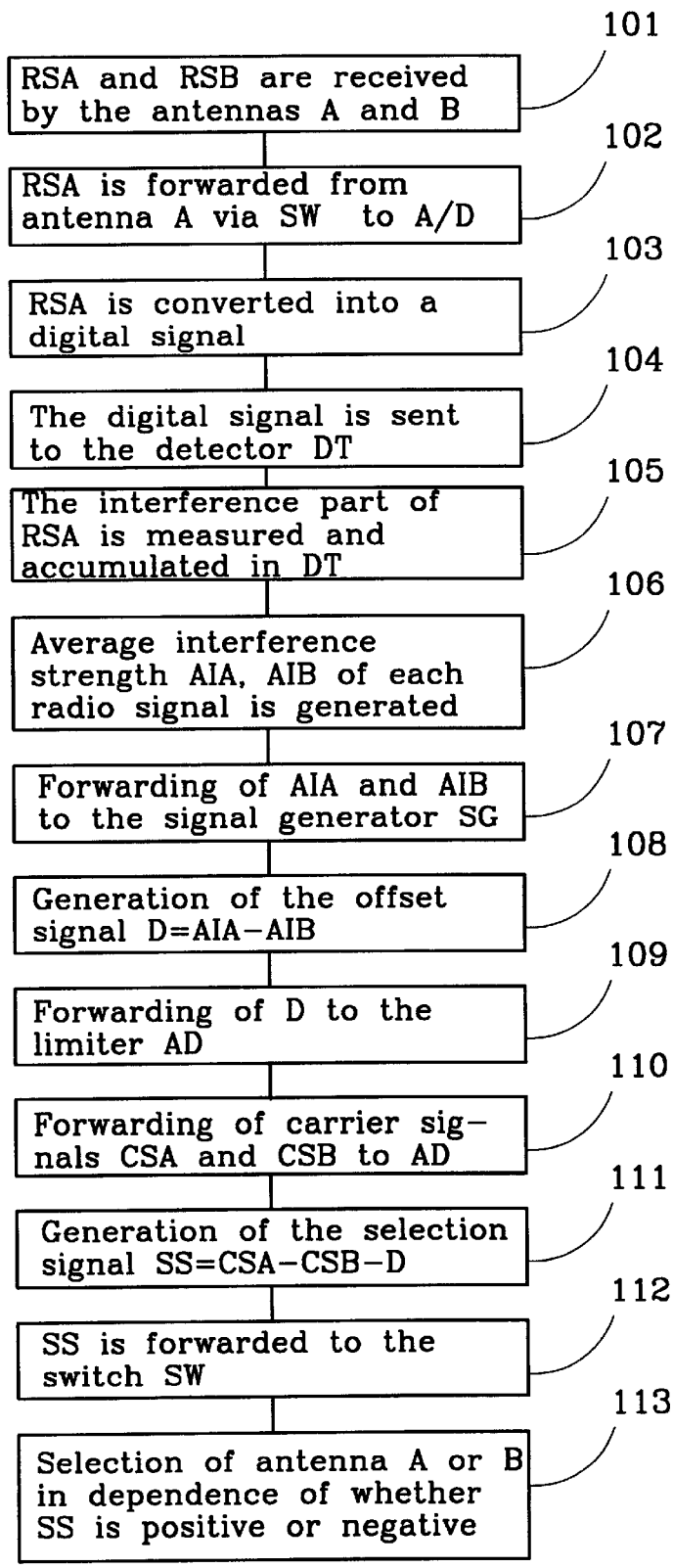
FIG. 4 is a flow chart which illustrates the procedure for selecting one of the antennas in the receiver in FIG. 3.

FIG. 4 is a flow sheet illustrating the aforedescribed method. The flow sheet illustrates the steps that are most essential to the concept behind the invention. The abbreviations in the text in the figure have been explained in the foregoing. The method is carried out in accordance with FIG. 4 and in accordance with the following description:

Radio signals RSA and RSB are received by the antennas A and B respectively, in accordance with block 101.

The first radio signal RSA is forwarded from the first antenna A via the switch SW to the A/D-converter A/D, in accordance with block 102.

The received first analogue radio signal RSA is converted into a digital signal, in accordance with block 103.

The digital radio signal is sent to the detector DT, in accordance with block 104.

The signal strength of the interference part of the received radio signal RSA is measured and added to the already accumulated interference signals received from antenna A, in accordance with block 105.

The average interference signal strength AIA, AIB for each of the accumulated signals is generated in the detector, in accordance with block 106.

The average interference signal strengths AIA and AIB are forwarded to the signal generator SG, in accordance with block 107.

The threshold offset signal D is generated, in accordance with block 108.

The threshold offset signal D is forwarded to the third input of the adder AD, in accordance with block 109.

The carrier signal strength CSA of the signal received by the first antenna A is sent to the first input of the adder AD2 and the carrier strength CSB of the signal received by the second antenna B is sent to the second input of the adder, in accordance with block 110.

The selection signal SS is generated in the adder AD2, in accordance with block 111.

The selection signal SS is forwarded to the switch SW, in accordance with block 112.

One of the antennas A, B is selected, in accordance with block 113.

Figure 5:
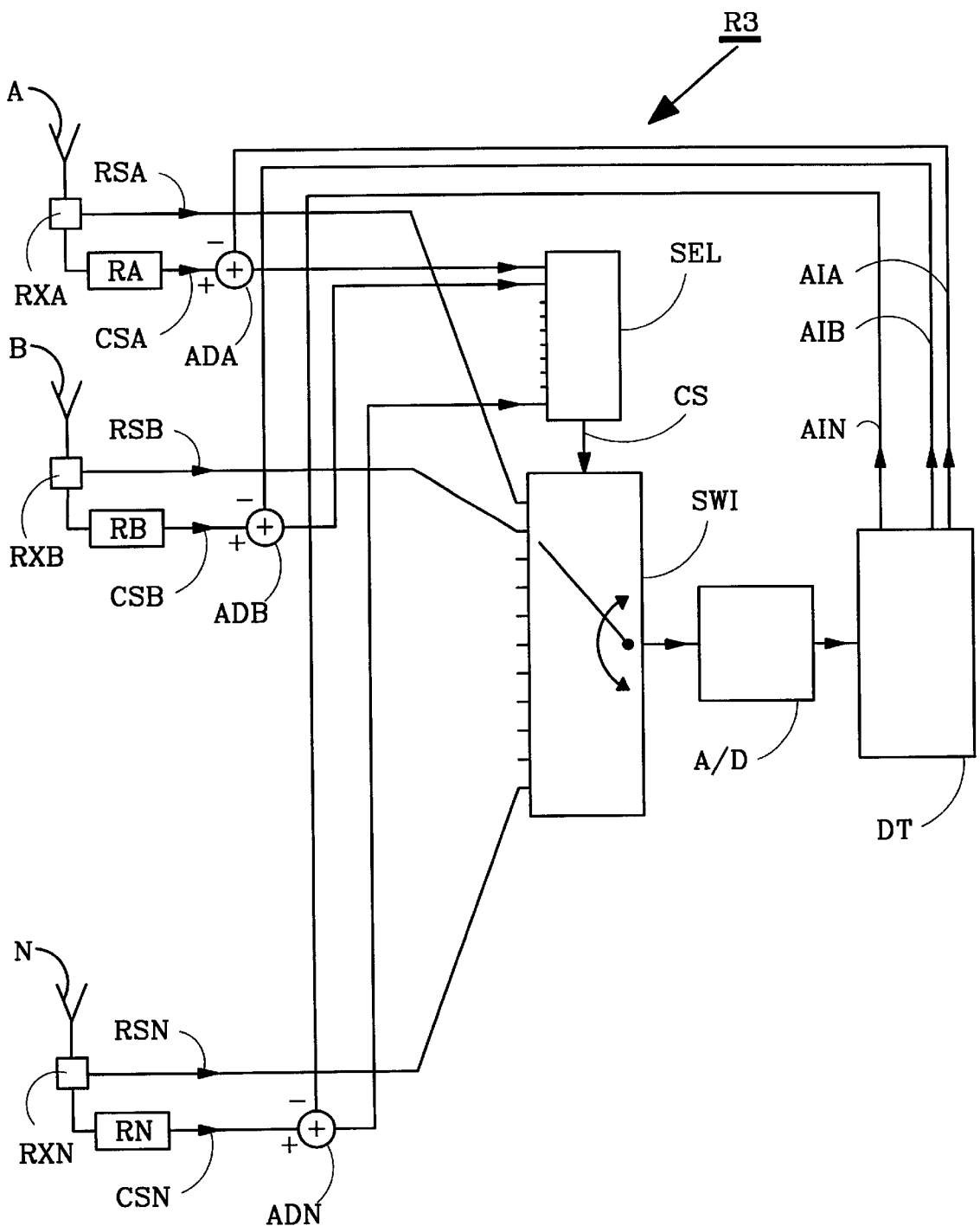
FIG. 5 is a block schematic illustration of a radio receiver, in accordance with the invention, having a plurality of antennas.

In FIG. 5 a selection diversity receiver R3 representing a second embodiment is shown. The receiver comprises a plurality of antennas. Each one of the antennas A, B to N is connected to a switch SWI via amplifier/down-converters RXA to RXN. An analogue to digital converter A/D is applied to the selected antenna via the switch SWI. A detector/equaliser DT is arranged to receive a converted digital signal from the A/D-converter. The converter A/D and the detector DT are both of the same type as the ones described earlier in the previous embodiment shown in FIG. 3. The detector produces an average interference value AIA, AIB to AIN of radio signals RSA, RSB to RSN from each of the antennas A, B to N. Measuring means RA, RB to RN for RSSI measurements are adapted to each of the antennas via the down-converters RXA to RXN. Each measuring means RA, RB, RN is adapted to a first input of an adder ADA, ADB to ADN. Each average interference value AIA, AIB to AIN is fed back to a second input of each adder adapted to the antenna to which the average interference value belongs. The outputs from the adders ADA, ADB to ADN are each one adapted to one of several inputs of a selector SEL. The output of the selector SEL is adapted to a control input of the switch SWI.

A method for diversity selection will now be shown. The method is put into practise by the configuration described above. By using the method, a radio signal will be selected depending on the best carrier of the received signals RSA, RSB to RSN in relation to the average interference signal strength of the radio signal in question. When the method starts, the switch SWI is in a position selecting the antenna B. This can be seen in FIG. 5. At the beginning, all AIA, . . . , AIN are set to equal values, e.g. zero. The method comprises the following further steps:

Radio signals RSA, RSB to RSN are received by the antennas A, B to N respectively.

A radio signal RSB is forwarded from antenna B via the switch SWI to the A/D-converter A/D.

The received analogue radio signal is converted into a digital signal.

The digital radio signal is sent to the detector DT.

The signal strength of the interference part of the received radio signal RSB is measured in the detector DT and added to the already accumulated interference signals received from antenna B.

Average interference signal strength AIA, AIB to AIN of each of the accumulated signals, i.e. from each one of the antennas A, B to N, are generated in the detector DT.

The average interference signal strength AIA, AIB to AIN is forwarded to the second input of each corresponding adder ADA, ADB to ADN.

Carrier signal strength CSA, CSB to CSN of radio signals RSA, RSB to RSN received by the antennas are sent to the first input of the adders adapted to each antenna respectively.

A signal corresponding to carrier in relation to average interference signal strength is sent from each adder to the corresponding inputs of the selector SEL.

A control signal CS is generated in the selector. The signal CS points out which one of the signals received by the inputs of the selector SEL was having the best carrier in relation to the interference signal strength.

The control signal CS is forwarded to the switch SW.

One of the antennas A, B to N is selected. The position of the switch depends on the received indication of the control signal CS. If e.g. antenna A have the strongest carrier to interference signal strength, the switch will be changed over from antenna B to antenna A. The selection of an antenna thereby depends of the best carrier of the received signals RSA, RSB to RSN in relation to the average interference signal strength.

Figure 6:
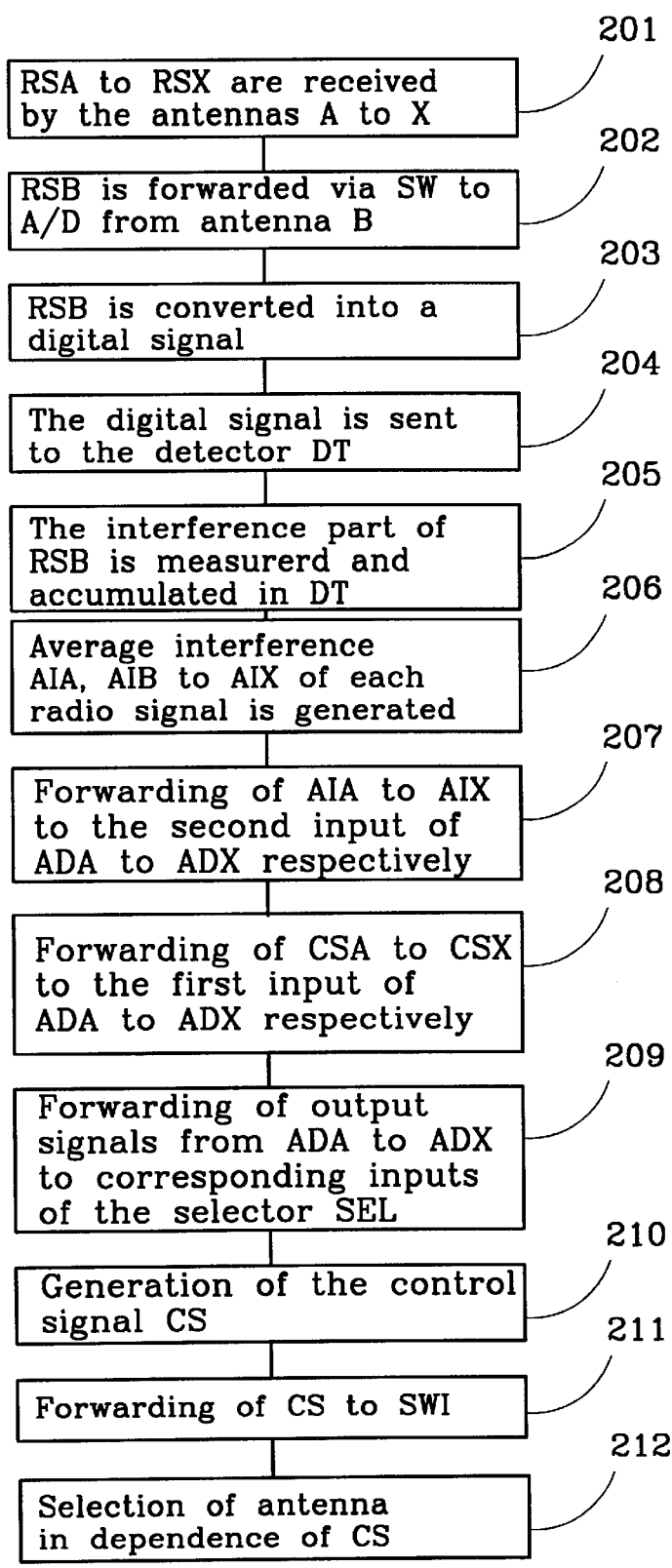
FIG. 6 is a flow sheet which illustrates the procedure for selecting one of the antennas in the receiver in FIG. 5.

FIG. 6 is a flow sheet illustrating the aforedescribed method. The flow sheet illustrates the steps that are most essential to the concept behind the invention. The abbreviations in the text in the figure have been explained in the foregoing. The method is carried out in accordance with FIG. 6 and in accordance with the following description:

Radio signals RSA, RSB to RSN are received by the antennas A, B to N respectively, in accordance with block 201.

The radio signal RSB is forwarded to the A/D-converter A/D, in accordance with block 202.

The received analogue radio signal is converted into a digital signal, in accordance with block 203.

The digital radio signal is sent to the detector DT, in accordance with block 204.

The signal strength of the interference part of the received radio signal RSB is added in the detector DT to the already accumulated interference signals received from antenna B, in accordance with block 205.

Average interference signal strength AIA, AIB to AIN are generated in the detector DT, in accordance with block 206.

The average interference signal strength AIA, AIB to AIN is forwarded to the second input of each corresponding adder ADA, ADB to ADN, accordance with block 207.

Carrier signal strength CSA, CSB to CSN are sent to the first input of the adders adapted to each antenna respectively, accordance with block 208.

The signal corresponding to carrier in relation to average interference signal strength is sent from each adder to the corresponding inputs of the selector SEL, accordance with block 209.

The control signal CS is generated in the selector. The signal CS points out which one of the signals received by the inputs of the selector SEL was having the best carrier in relation to the interference signal strength The control signal CS is forwarded to the switch SW, accordance with block 210.

One of the antennas A, B to N is selected, accordance with block 211.

Figure 7:
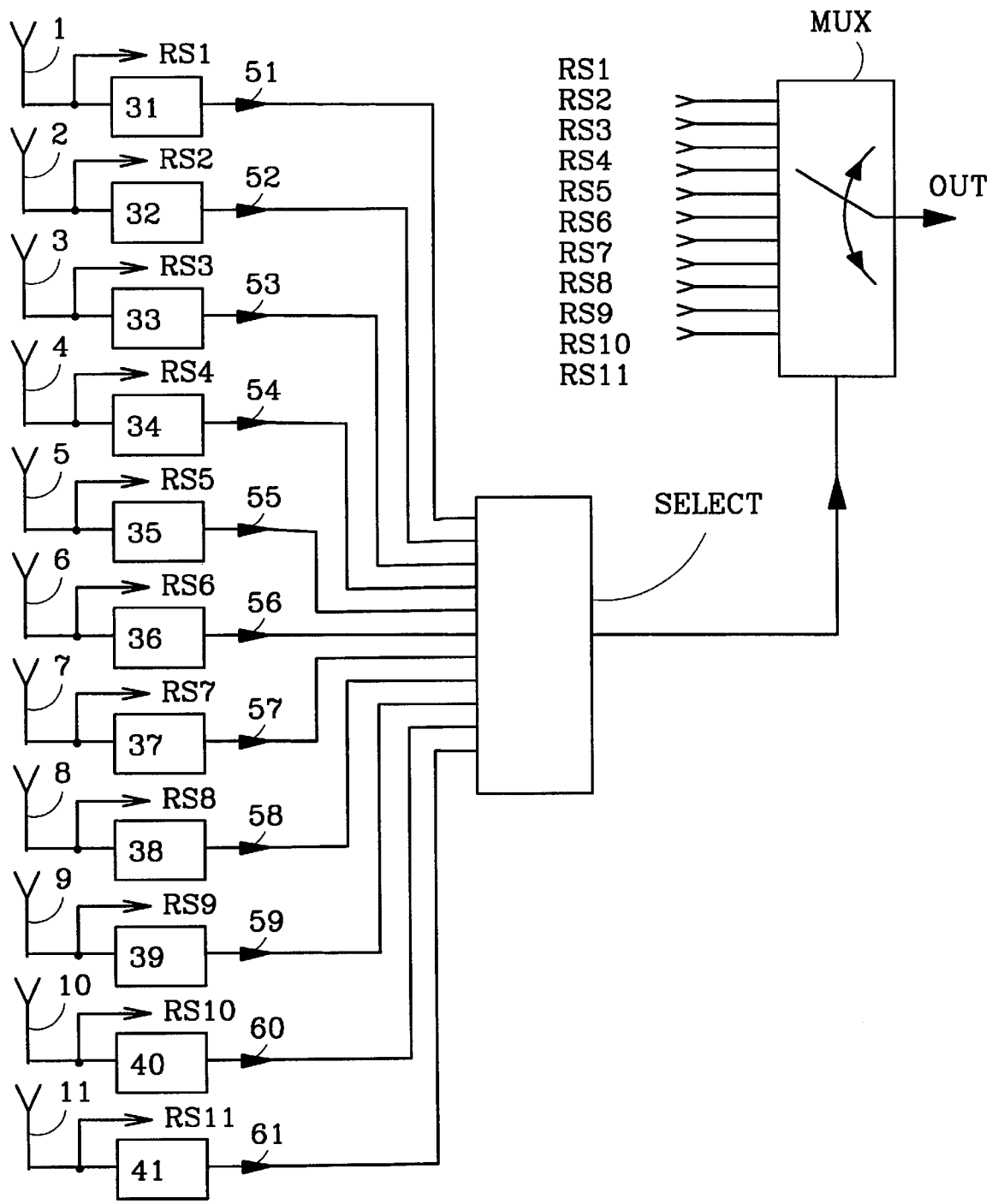
FIG. 7 is an arrangement having a great number of antennas according to the invention.

In FIG. 7 a simplified block diagram is shown illustrating an arrangement 100 with a great number of antennas according to the invention.

The arrangement 100 according to the embodiment comprises eleven antennas 1 to 11. Each antenna is adapted to an evaluation means 31 to 41. Each evaluation means 31 to 41 evaluate a radio signal RS1 to RS11 received by the, to the means, corresponding antenna 1 to 11. The output of each evaluation means is equivalent to a carrier part of the radio signal in relation to average interference signal strength of the radio signal over a period of time 51 to 61. A selector means SELECT comprises eleven inputs. Each input of the selector SELECT is adapted to the output of each one of the eleven evaluation means 31 to 41. The selector determine the received signal that have the strongest carrier to average interference signal strength. The selector is adapted to a multiplex arrangement MUX. The multiplex is affected by the output of the selector to change over to the antenna that delivers OUT the radio signal having the strongest carrier signal in relation to average interference signal strength.

A large number of variations of the above mentioned embodiments are of course possible. The generation of the average interference powers can e.g. take place either before or after the switch/multiplex means. The antenna switch can e.g. be located closer to the antenna, before the receiver part RX. This makes it possible to have a common RX and a common RSSI measurement for all antenna branches. In such an embodiment, the RSSI measurements can e.g. take place directly after the RX part or inside the detector. The switch SW in e.g. FIG. 3 is in one (upper) position to meassure RSSI from antenna A and in another (lower) position to meassure RSSI from antenna B. This is especially useful when the received signal is non-continuos (divided into frames or bursts, such as in TDMA). The RSSI measurements can then be done at the beginning of the frame or burst, by measuring the antenna signals in a time divided mode during a preamble. Such a measurement scheme is described in a conference paper by Akaiwa, "Antenna Selection Diversity for Framed Digital Signal Transmission in Mobile Radio Channel", 39th Vehicular Technology Conference, VTC 89, San Francisco, May 1989.

The invention is thereby not restricted to the aforedescribed and illustrated exemplifying embodiments since modifications can be made within the scope of the following claims.

What is claimed is:

1. A method of diversity selection of antenna paths in a radio receiver utilizing at least two antennas, said method comprising the steps of:

generating average interference powers of radio signals received over a period of time from each of the antennas;

determining an instantaneous carrier signal strength of radio signals which arrive at each of the antennas;

calculating a ratio of instantaneous carrier signal strength in relation to average interference power for each of the antennas; and selecting the antenna having the highest ratio of instantaneous carrier signal strength in relation to average interference power.

2. The method according to claim 1, wherein a plurality of antenna paths exist, each path corresponding to an external antenna, and the step of selecting the antenna includes selecting an antenna path corresponding to the antenna having the highest ratio of instantaneous carrier signal strength in relation to average interference power.

3. A method of diversity selection of antenna paths in a radio receiver comprising two antennas and a selection switch for selecting one of said antennas, the method comprising the steps of:

accumulating interference power measurements of radio signals received over a period of time at each of the antennas;

calculating an average interference power for each antenna from the accumulated interference power measurements;

determining a threshold offset value representing the difference between the average interference powers for the two antennas;

determining a carrier signal strength of radio signals received at each of the antennas;

determining the difference between the carrier signal strengths for the two antennas;

generating a selection signal representing the threshold offset value subtracted from the difference between the carrier signal strengths; and switching to another antenna path based on whether the selection signal is positive or negative.

4. An arrangement for diversity selection of antenna paths in a radio receiver having two antennas and a selection switch for selecting one of said antennas, the arrangement comprising:

means for calculating, for each of the antennas, an average interference power of radio signals received over a period of time at each of the antennas;

means for determining a threshold offset value representing the difference between the calculated average interference powers for the two antennas;

means for determining a carrier signal strength of radio signals received at each of the antennas;

means for determining the difference between the carrier signal strengths for the two antennas;

means for generating a selection signal representing the threshold offset value subtracted from the difference between the carrier signal strengths for the two antennas; and means for switching to another antenna path based on whether the selection signal is positive or negative.

5. The arrangement according to claim 4, wherein the antenna paths are unbalanced.

6. The arrangement according to claim 4, wherein at least one of the antennas is an internal antenna.

7. The arrangement according to claim 4, wherein the means for generating a carrier signal strength at each of the antennas is located between the switching means and the means for calculating the average interference power for each antenna.

8. The arrangement according to claim 4, wherein the means for calculating the average interference power for each antenna receives an interference measurement from a single detector.

* * * * *